(12) United States Patent
Liu et al.

(10) Patent No.: US 10,530,260 B2
(45) Date of Patent: Jan. 7, 2020

(54) ADAPTIVE CONTROL FOR ZERO-VOLTAGE SWITCHING IN A MULTI-SWITCH SWITCHING POWER CONVERTER

(71) Applicant: DIALOG SEMICONDUCTOR INC., Campbell, CA (US)

(72) Inventors: Wenduo Liu, Campbell, CA (US); Cong Zheng, Campbell, CA (US); Xiaoyan Wang, Campbell, CA (US); Pengju Kong, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 15/876,054

(22) Filed: Jan. 19, 2018

(65) Prior Publication Data

US 2019/0229624 A1    Jul. 25, 2019

(51) Int. Cl.
*H02M 3/335* (2006.01)
*H02M 1/00* (2006.01)

(52) U.S. Cl.
CPC ..... *H02M 3/3353* (2013.01); *H02M 3/33507* (2013.01); *H02M 2001/0003* (2013.01); *H02M 2001/0058* (2013.01)

(58) Field of Classification Search
CPC .................................................... H02M 3/335
See application file for complete search history.

(56) References Cited

U.S. PATENT DOCUMENTS

| | | | | |
|---|---|---|---|---|
| 2009/0295350 | A1* | 12/2009 | Yamada | H02M 3/1588 323/282 |
| 2011/0194313 | A1* | 8/2011 | Yoshinaga | H02M 3/33569 363/21.12 |
| 2017/0005585 | A1* | 1/2017 | Shimura | H02M 3/33569 |
| 2017/0302178 | A1* | 10/2017 | Bandyopadhyay | H02M 3/158 |

* cited by examiner

*Primary Examiner* — Jue Zhang
*Assistant Examiner* — Trinh Q Dang
(74) *Attorney, Agent, or Firm* — Haynes and Boone, LLP

(57) ABSTRACT

A switching power converter is provided that adaptively changes the on-time period for an auxiliary switch transistor to locate a boundary between sufficient and insufficient energy.

10 Claims, 6 Drawing Sheets

ADAPTIVE CONTROL FOR ZERO-VOLTAGE SWITCHING IN A MULTI-SWITCH SWITCHING POWER CONVERTER

TECHNICAL FIELD

This application relates to switching power converters, and more particularly to an adaptive control for zero-voltage switching in a multi-switch switching power converter.

BACKGROUND

The high efficiency of switching power converters such as flyback converters has led to their virtual universal adaption as the battery charger for mobile devices. In a flyback converter, a primary-side controller controls the cycling of a power switch transistor that connects between the transformer's primary winding and ground. A rectified AC mains voltage drives the primary winding current when the power switch is cycled on. The rectified AC mains voltage can be several hundred volts such that it can stress the power switch transistor. To minimize the switching stress for the power switch transistor, both quasi-resonant (valley-mode switching) and zero-voltage switching techniques are known. For example, it is known to employ valley switching techniques with regard to the resonant oscillation of the drain voltage for the power switch transistor when it is cycled off. The peak voltages for the resonant oscillation can be relatively robust (as much as 200 V or higher) whereas the minimum voltages (the valleys in the resonant oscillations) are much lower. Valley-mode switching thus involves the detection or prediction of a particular valley in the resonant oscillations so that the power switch transistor may be switched on at the time of the particular valley.

Although valley-mode switching thus lowers the voltage stress on the power switch transistor, note that the valley voltages are not zero but may range from 20 V or even higher such as 60 V. This relatively high drain voltage is then discharged to ground when the power switch transistor is cycled on, which lowers efficiency. A more power-efficient alternative to valley-mode switching is zero-voltage-switching (ZVS). In ZVS operation, the leakage energy in the transformer is stored and reclaimed in a capacitor that is coupled to the drain voltage of the power switch transistor through an active clamp switch. The active clamp switch is cycled on at the peak of the resonant oscillations, whereupon the drain voltage is discharged below ground as the leakage energy is reclaimed. An ZVS architecture thus has no stressing switches at the on-time of the power switch transistor.

However, the detection of the zero-voltage switching point has so far proven to be problematic. In particular, it is conventional to calculate the circuit energy so as to estimate the needed energy to complete a half-cycle of resonant oscillation. But such an estimation relies heavily on the accuracy of the circuit parameters and is thus subject to considerable process variation. Moreover, the half-cycle estimation is lengthy and consumes substantial calculation power. The resulting inaccuracies result in either a hard turn of the power switch or waste of resonant energy and large voltage stress.

Accordingly, there is a need in the art for improved control of zero-voltage switching for switching power converters.

SUMMARY

A technique to achieve optimal zero-voltage switching is provided for a switching power converter and/or a boost converter that includes a power switch transistor connected to an inductive storage element. In a non-isolated switching power converter such as a buck converter, the inductive storage element is an inductor whereas it is a primary winding of a transformer in an isolated switching power converter such as a flyback converter. Regardless of whether the switching power converter drives an isolated load or not, the power switch transistor allows a positive current to flow through the inductive storage element when the power switch transistor is turned on in a switching cycle. The power switch transistor then cycles off so that the stored energy in the inductive storage element may be delivered to the load. To achieve optimal zero-voltage switching, the techniques and systems disclosed herein adapt the on-time of an auxiliary switch transistor. The auxiliary switch transistor is cycled on for an adaptive on-time period after the power switch transistor is cycled off. When the auxiliary switch transistor is switched off following its adaptive on-time, a negative current is induced in the inductive storage element.

In a flyback converter, the negative current discharges the drain terminal for the power switch transistor. If the adaptive on-time period is relatively short, the drain terminal does not discharge to ground but instead discharges to a positive local minimum and begins resonantly oscillating. If the adaptive on-time period is relatively long, the drain terminal discharges to ground. Since the source terminal is grounded for a flyback converter's power switch transistor, the drain-to-source voltage for the power switch transistor is zero volts when the drain terminal is grounded so that it may be switched on using zero-voltage switching. Conversely, the negative current charges the source terminal in a buck converter. The drain terminal is charged to the input voltage. Thus, if the adaptive on-time period is relatively long, the source terminal may be charged to the input voltage, which makes the drain-to-source voltage for the buck converter's power switch transistor to be zero volts so that it may be switched on using zero-voltage switching. If the adaptive on-time period is relatively short, the drain-to-source voltage for the buck converter's power switch transistor would instead resonantly oscillate through a series of positive voltage valleys (local minima).

Relatively short adaptive on-time periods that result in valley-mode oscillations of the drain terminal voltage that do not have a magnitude sufficient to make the drain-to-source voltage zero volts produce a condition denoted herein as insufficient energy. In contrast, relatively long adaptive on-time periods that result in a zero drain-to-source voltage for the power switch transistor produce a condition denoted herein as sufficient energy. But note that as the adaptive on-time period is extended, the energy becomes "too sufficient" such that the drain-to-source voltage is pulled below zero rather than just to zero. Switching on the power switch transistor with such a negative drain-to-source stresses the transistor and lowers efficiency. But prior art zero-voltage switching techniques never recognized that there is an optimal boundary between the inefficient and efficient energy conditions that produce the optimal zero-voltage switching conditions. The zero-voltage switching technique disclosed herein adapts the adaptive on-time period so that the switching power converter operates at the boundary between the sufficient and insufficient energy conditions. The resulting control is quite advantageous with regard to minimizing switching stress and increasing efficiency.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

All isolated switching power converters and/or boost converters include a power switch transistor that, when switched on, allows a positive magnetizing current to develop in a primary winding of a transformer. While the primary winding conducts, a secondary winding for the transformer is prevented from conducting. The control of the secondary winding current may be performed by an output diode but more efficient designs use a synchronous rectifier (SR) switch transistor for controlling when the secondary winding conducts. The SR switch transistor is switched on while the secondary winding current flows and is then switched off. In a discontinuous conduction mode of operation, the switching off of the SR switch transistor induces a negative magnetizing current in the primary winding that lowers the drain voltage for the power switch transistor. The amount of discharge of the drain voltage for the power switch transistor depends upon the synchronous rectifier switch on time. Should the on time be relatively short, the power switch transistor's drain voltage does not discharge all the way to ground but instead resonantly oscillates through a series of local minima denoted as valleys. These valleys are exploited in valley-mode switching modes of operation as the appropriate switch on times for the power switch transistor to minimize the switching stresses and loss. But if the synchronous rectifier switch is maintained for a greater duration, the drain voltage for the power switch transistor is discharged to ground. Since the source is grounded, the drain-to-source voltage for the power switch transistor is zero volts if the drain voltage is discharged to ground. A zero-voltage switching mode of operation may then be implemented so that the power switch transistor is cycled on when its drain-to-source voltage is zero.

Figure 1A:
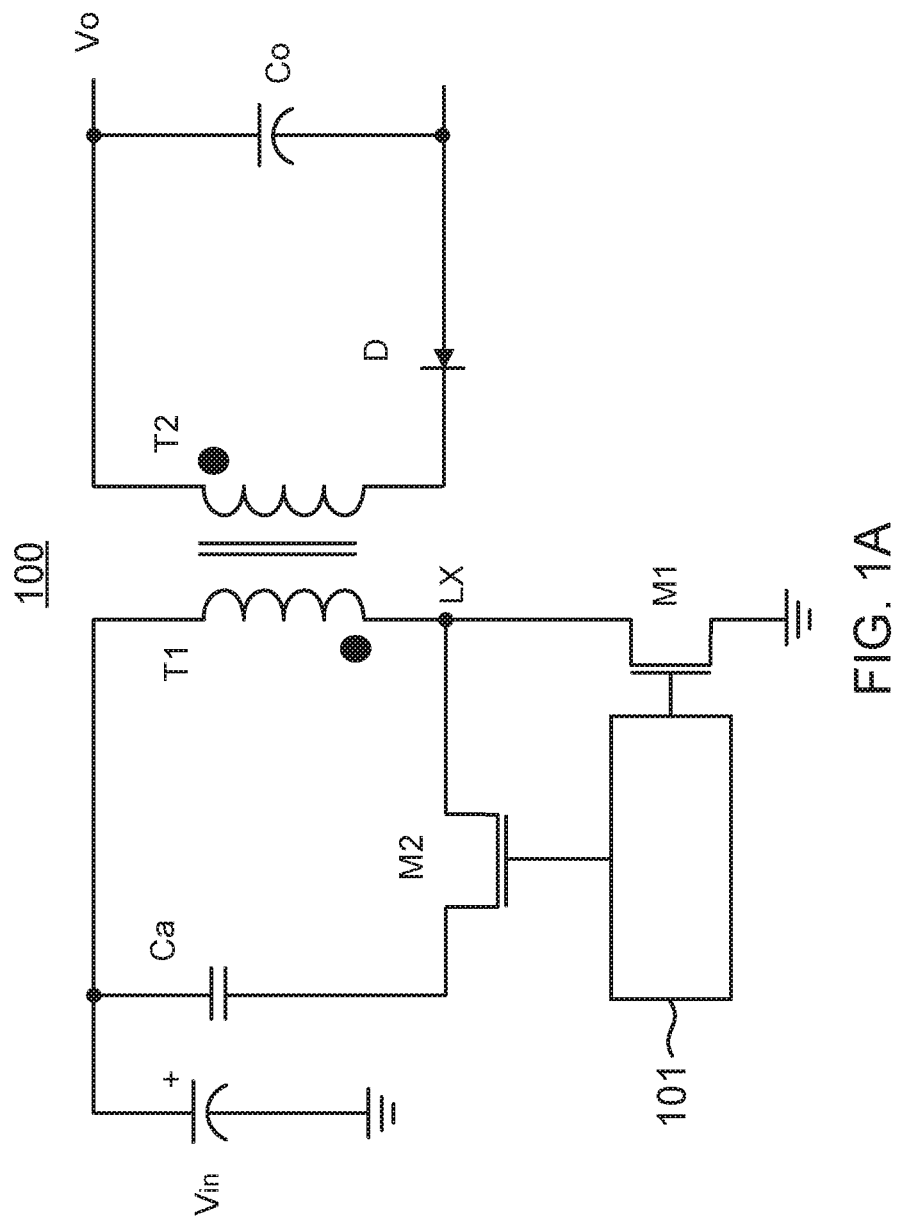
FIG. 1A is a circuit diagram of an example active clamp flyback converter configured for optimal zero-voltage switching in accordance with an aspect of the disclosure.

The synchronous rectifier switch on time thus controls whether the power switch transistor may be cycled using valley-mode switching or zero-voltage switching operation. But such control of the switching mode for the power switch through the on time duration of an auxiliary switch transistor is not limited to flyback converters with synchronous rectification. As used herein, the term "auxiliary switch transistor" is defined in conjunction with a power switch transistor that allows a positive current to flow through an inductive storage element when the power switch transistor is cycled on. The auxiliary switch transistor is configured so that it induces a negative current in the inductive storage element after the auxiliary switch transistor is cycled on for a sufficiently long duration and then cycled off. With regard to a flyback converter with synchronous rectification, the inductive storage element is the primary winding and the positive current is the magnetizing current. But there are numerous other types of switching power converters that include such an auxiliary switch transistor. For example, turning now to the drawings, FIG. 1A illustrates an active clamp flyback converter 100 that includes a power switch transistor M1 and also an active clamp switch transistor M2 that functions as an auxiliary switch transistor. During a power switch cycle, power switch transistor M1 is cycled so that a magnetizing current builds up in a primary winding T1 as powered by an input voltage source Vin. This magnetizing current flows from an input power rail for the primary winding T1 into the drain node LX of power switch transistor M1. While power switch transistor M1 is on, an output diode D is reversed biased. Output diode D is connected to a secondary winding T2 for the flyback converter's transformer so that no secondary winding current flows while the power switch transistor M1 is conducting. When power switch transistor M1 is switched off, output diode D becomes forward biased so that the secondary current flows to charge an output voltage Vo across an output capacitor Co. A load (not illustrated) is powered by the output voltage (or the output current from secondary winding T2).

But the transformer is not perfect such that some of the magnetic energy in the primary winding T1 does not couple with second winding T2 but instead charges a leakage inductance for primary winding T1 while power switch transistor M1 is on. This leakage energy is captured by an active clamp capacitor Ca in series between active clamp switch transistor M2 and the input voltage rail for the primary winding T1. The stored energy is then returned to the transformer by cycling active clamp switch M2 on while power switch M1 is off. Depending upon the on-time duration for the active clamp switch transistor M2, the drain voltage on node LX may be discharged to ground due to the negative current flowing through the primary winding in response to the cycling off of the active clamp switch transistor M2. It may thus be appreciated that active clamp switch transistor M2 satisfies the definition provided earlier for an auxiliary switch transistor in that when active clamp switch transistor M2 is cycled on and then off, a negative current flows through primary winding T1.

Figure 1B:
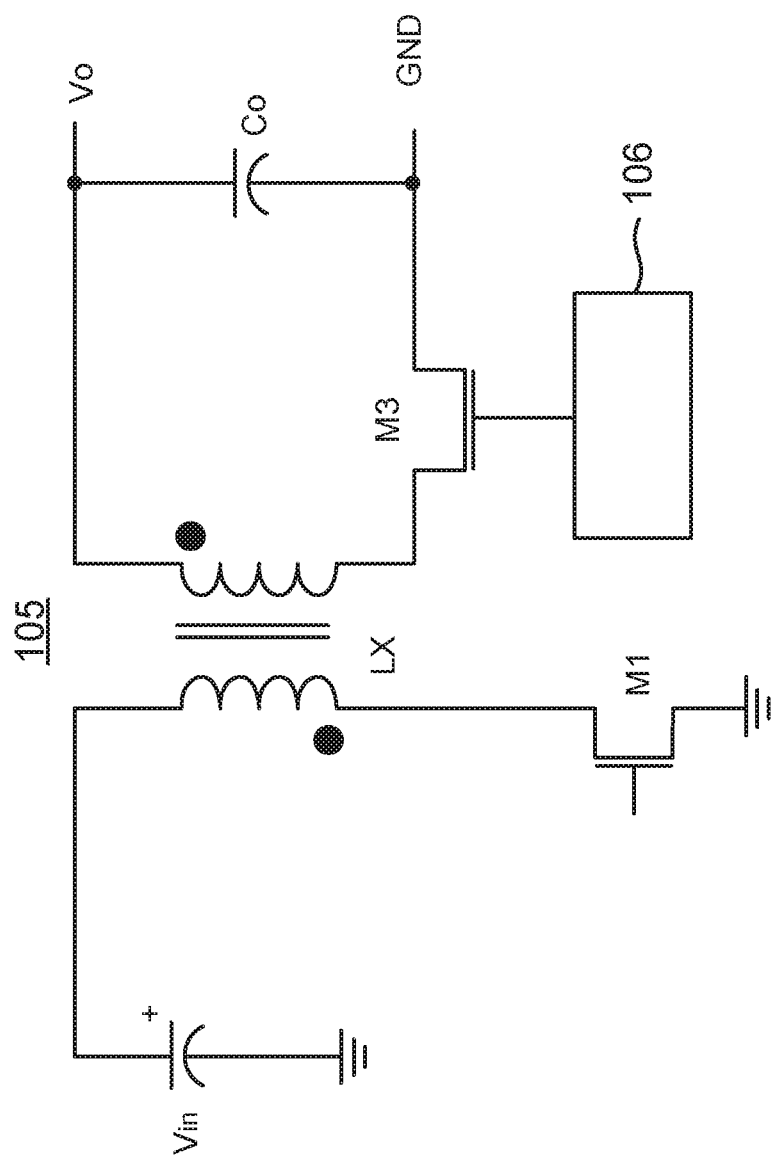
FIG. 1B is a circuit diagram of a flyback converter with synchronous rectification configured for optimal zero-voltage switching in accordance with an aspect of the disclosure.

A synchronous rectifier (SR) flyback converter 105 as shown in FIG. 1B. Power switch transistor M1 is in series with primary winding T1 as discussed with regard to active clamp flyback converter 100. But the output diode D on the secondary side of the transformer is replaced by an SR switch transistor M3. While the primary switch transistor M1 is on, a secondary controller 106 would maintain SR switch transistor M3 off and then cycle SR switch transistor M3 for an SR on time on in response to the cycling off of the power switch transistor M1. The secondary current then pulses high and ramps down to zero at the completion of the SR on time (in a discontinuous conduction mode of operation), Should the SR on time be sufficiently long so that the secondary current ramps down to zero, the output voltage Vo forces a negative secondary current to flow through secondary winding T1. The resulting stored magnetic energy in the transformer then pulls the LX node voltage low and forces a negative magnetizing current to flow from the LX node to the input power rail following the completion of the auxiliary switch on time. SR switch transistor M3 thus satisfies the definition herein of an auxiliary switch transistor.

Figure 1C:
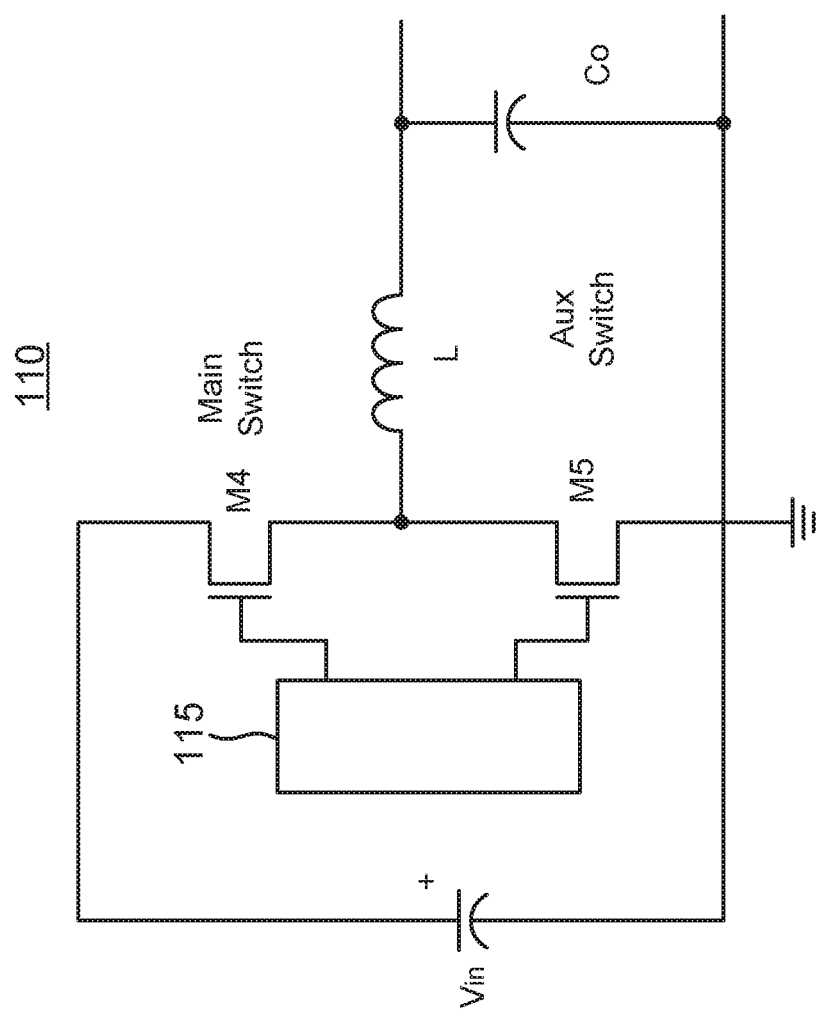
FIG. 1C is a circuit diagram of a buck converter configured for optimal zero-voltage switching in accordance with an aspect of the disclosure.

Another example of an auxiliary switch transistor is given by a low-side transistor M5 in a buck converter 110 shown in FIG. 1C. Buck converter 110 includes a high-side switch transistor M4 (Main Switch) that couples between an input voltage node and an inductor L. During a power switch cycle, high-side switch transistor M4 is switched on to allow a positive current to begin increasing through inductor L. After the desired peak current is reached, high-side switch transistor M4 is switched off. At that point, low-side switch transistor M5 is switched on so that the inductor L may freewheel and charge an output capacitor Co with the output voltage. The positive current through inductor L will discharge to zero and become negative if the on-time duration for low-side switch transistor M5 is sufficiently long. When low-side switch transistor M5 cycles off, the resulting negative current through inductor L may charge the drain terminal for high-side switch transistor M4 to the input voltage Vin such that its drain-to-source voltage is zero. Low-side switch transistor M5 thus satisfies the definition of an auxiliary switch transistor as defined herein. Other examples of auxiliary switch transistors are included in active clamp forward converters, buck/boost converters with synchronized rectifiers, totem-pole bridgeless PFC converters, half-bridge converters, and full bridge converters.

An adaptive control technique is provided herein that controls the on time for the auxiliary switch transistor so as to develop an appropriate amount of negative current in the inductive storage element after the auxiliary switch transistor is cycled off. Depending upon the duration of the on time for the auxiliary switch transistor, the development of this negative magnetizing current forces the drain-to-source voltage for the power switch transistor to fall to zero in a resonant oscillation. The resonant oscillation for the power switch transistor's drain-to-source voltage that does not cross zero volts (or a voltage sufficiently close to zero) is denoted herein as an "insufficient energy" condition. An insufficient energy condition results from a too-short of an on time for the auxiliary switch transistor. In contrast, on times for the auxiliary switch transistor that result in the drain-to-source voltage for the power switch transistor dropping to or below zero volts (or some threshold voltage sufficiently close to zero) result in what is denoted herein as a "sufficient energy" condition. Since zero voltage switching may be deemed to exist if the power switch transistor is switched on at a sufficiently low voltage (close to zero volts), the threshold drain-to-source voltage for the power switch transistor that satisfies zero voltage switching is denoted herein as the "zero voltage switching threshold voltage." In general, the zero voltage switching threshold voltage is zero volts but it may be slightly positive (or negative) for alternative embodiments.

Regardless of whether the zero voltage switching threshold voltage is zero or non-zero, zero-voltage switching may thus be achieved for the power switch transistor by ensuring a sufficiently long on time for the auxiliary switch transistor so that a sufficient energy condition is achieved. But a too-long of an on time for the auxiliary switch transistor is also sub-optimal as the drain-to-source voltage for the power switch transistor may then be pulled below zero volts before the power switch transistor is cycled on. The resulting negative drain-to-source voltage for the power switch transistor when cycled on causes switching stress and wastes energy analogous to the same undesirable effects that occur with valley switching of the power switch transistor. Advantageously, the zero voltage switching technique disclosed herein operates at the boundary between insufficient and sufficient energy such that optimal zero voltage switching is achieved. In this fashion, power efficiency is maximized and power switching stresses are minimized.

The technique for locating the boundary between sufficient and insufficient energy for zero voltage switching of the power switch transistor depends upon whether a switching power converter includes a valley-mode detector and/or a zero-crossing detector. As known in the valley-mode switching arts, a valley-mode detector detects the valleys or local minima in the resonant oscillation of the power switch transistor's drain voltage following the cycling off of the power switch transistor. A conventional valley-mode detector can only detect valleys and does not detect minima that equal zero volts or less. Such a valley-mode detector is designated herein as a type I valley-mode detector. A more sophisticated valley-mode detector will be discussed further herein that can detect all minima such that it detects minima that equal zero volts or less. Such a valley-mode detector is designated herein as a type II valley-mode detector.

Figure 2:
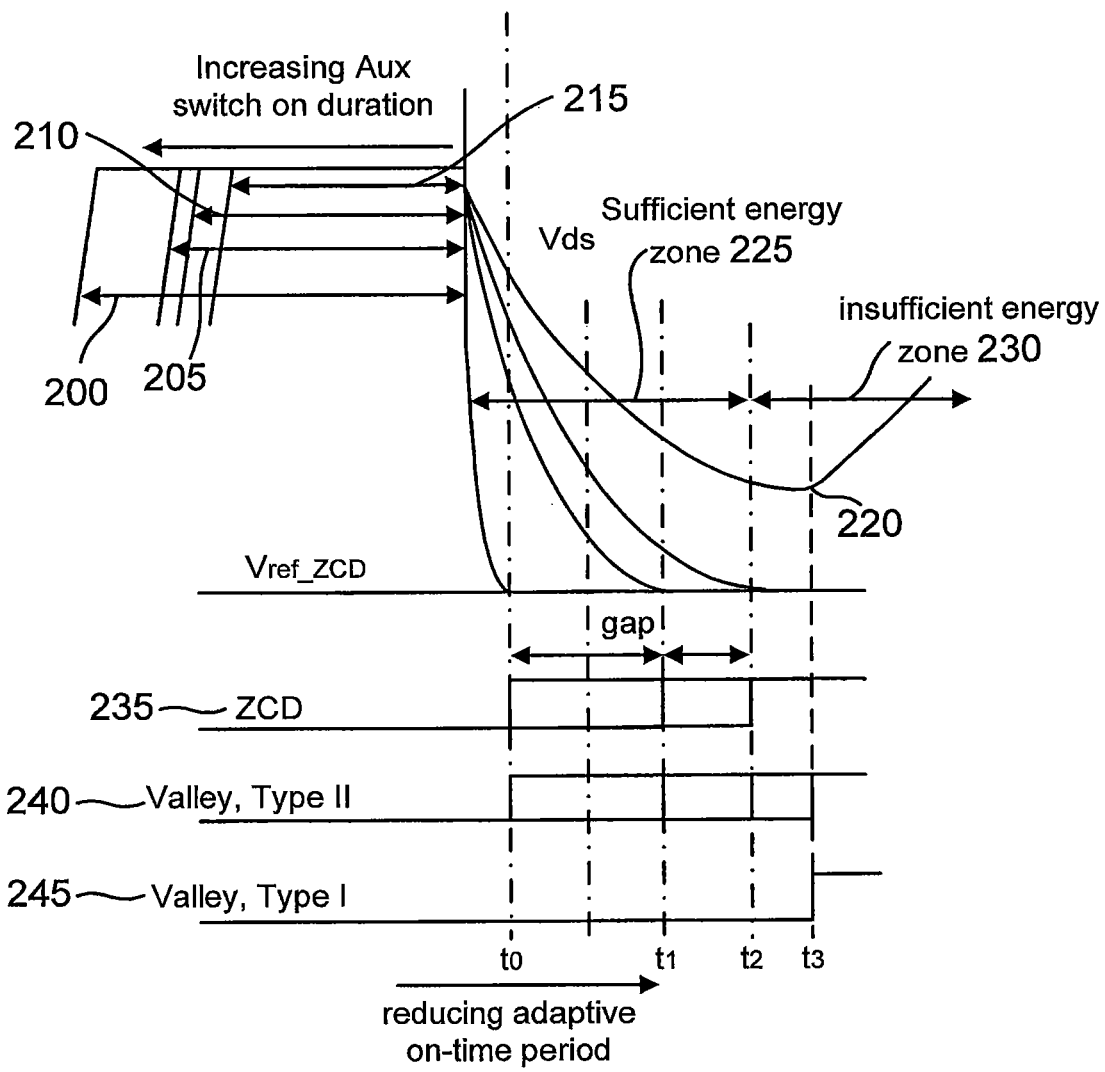
FIG. 2 illustrates the effect of auxiliary on-time period variation on the drain-to-source voltage and also on the detections of zero-crossings and valleys for the drain-to-source voltage in accordance with an aspect of the disclosure.

The effects on the drain-to-source voltage (Vds) for a power switch transistor from varying the adaptive on-time period for the auxiliary switch transistor may be better appreciated with reference to FIG. 2. A first adaptive on-time period 200 is relatively long and results in Vds dropping to zero at time t0. A second adaptive on-time period 205 is shorter than the period 200 and results in Vds dropping to zero at a time t1. A third adaptive on-time period 210 is shorter than period 205 and results in Vds dropping to zero at time t2. But note that a further reduction in the on-time period as shown for adaptive on-time period 215 results in a positive valley 220 for Vds at time t3 rather than a zero crossing. Adaptive on-time period 210 is thus resulting in an optimal zero-voltage switching at the boundary between sufficient energy zone 225 and insufficient energy zone 230.

Figure 3:
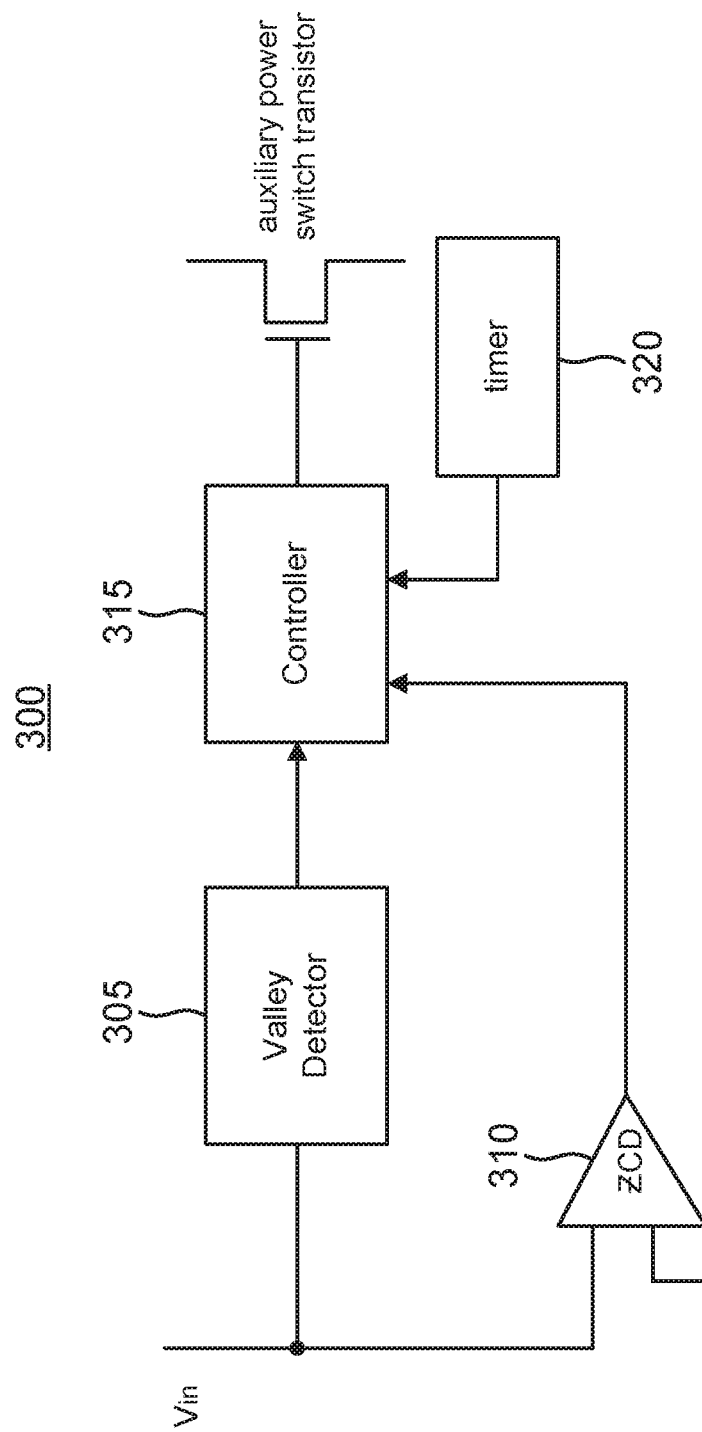
FIG. 3 is a diagram of an example controller for implementing optimal zero-voltage switching in accordance with an aspect of the disclosure.

With regard to these adaptive on-time periods, note that a zero-crossing detector (ZCD) 235 would detect the zero crossings at times t0, t1, and t2. But there is no response for ZCD 235 to valley 220. In contrast, a type II valley detector 240 not only detects the zero crossings at times t0, t1, and t2 but also detects valley 220 at time t2. Finally, a type I valley detector 245 only detects valley 220. Some example controllers that respond to these valley and zero-crossing detections by varying the adaptive on-time period to achieve optimal zero-voltage switching at the boundary between sufficient and insufficient energy will now be discussed. An example controller 300 is shown in FIG. 3. A valley detector 305 detects valleys in an input voltage Vin and transmits the valley identifications to a adaptive on-time control circuit 315. Similarly, a ZCD 310 detects zero crossing for the input voltage Vin and transmits the zero crossing identifications to adaptive on-time control circuit 315.

Adaptive on-time control circuit 315 varies the adaptive on-time period for an auxiliary switch transistor to enable optimal zero-crossing switching of a power switch transistor (not illustrated). Operation of adaptive on-time control circuit 315 for an implementation in which valley detector 305 is a type I valley detector will be discussed first. Should the adaptive on-time period be such that only valleys are detected, adaptive on-time control circuit 315 gradually increases the adaptive on-time until valleys are no longer detected but instead only zero-crossing detections are made. Adaptive on-time control circuit 315 thus detects the boundary between sufficient and insufficient energy so that optimal zero-voltage switching may ensue. Should the adaptive on-time period be such that only zero crossings are detected, adaptive on-time control circuit 315 may shorten the adaptive on-time period until valleys are detected. By again increasing the adaptive on-time period just until valleys cease and zero crossings are detected, the boundary between sufficient and insufficient energy is detected. Note that adaptive on-time control circuit 315 may operate without ZCD 310 yet still enable zero-voltage switching through the use of a timer 320. In particular, adaptive on-time control circuit 315 may respond to the detection of a valley by extending the adaptive on-time period by an increment of time and again observing whether valleys are detected. The adaptive on-time period may thus be extended until no valleys are detected. Timer 320 may thus trigger adaptive on-time control circuit 315 to switch on of the power switch transistor (not illustrated) in response to the expiration of a time-out period. The time-out period may be adaptively adjusted in alternative embodiments.

Operation of adaptive on-time control circuit 315 with a type II valley detector 305 will now be discussed for an embodiment that does not include ZCD 310. Note that the time gap between the zero-crossing times for sufficient energy cases as a function of time for the adaptive on-time period may be observed by adaptive on-time control circuit 315. In the insufficient energy regime, this time gap is quite small since the resonant oscillation frequency is fairly stable. But at the boundary with sufficient energy operation, the time gap will become relatively large. Adaptive on-time controller 300 may thus observe the time gap and detect the optimal zero-crossing condition without the use of ZCD 310. Alternatively, ZCD 310 may be used in conjunction with a type II valley detector 305.

In addition, note that adaptive on-time control circuit 315 may operate with only ZCD 310. Beginning with sufficient energy operation, adaptive on-time control circuit 315 may progressively reduce the adaptive on-time period and observe the gap increase between the corresponding zero crossings. The gap will increase until insufficient energy is reached, whereupon there are no more zero crossings. In such a case, timer 320 may time out and trigger a power switch cycle. Adaptive on-time control circuit 315 may thus determine the maximum gap prior to insufficient energy operation and set the adaptive on-time period for optimal zero-crossing accordingly. Referring again to FIGS. 1A, 1B, and 1C, controllers 101, 106, and 115 may operate as discussed with regard to controller 300.

Figure 4:
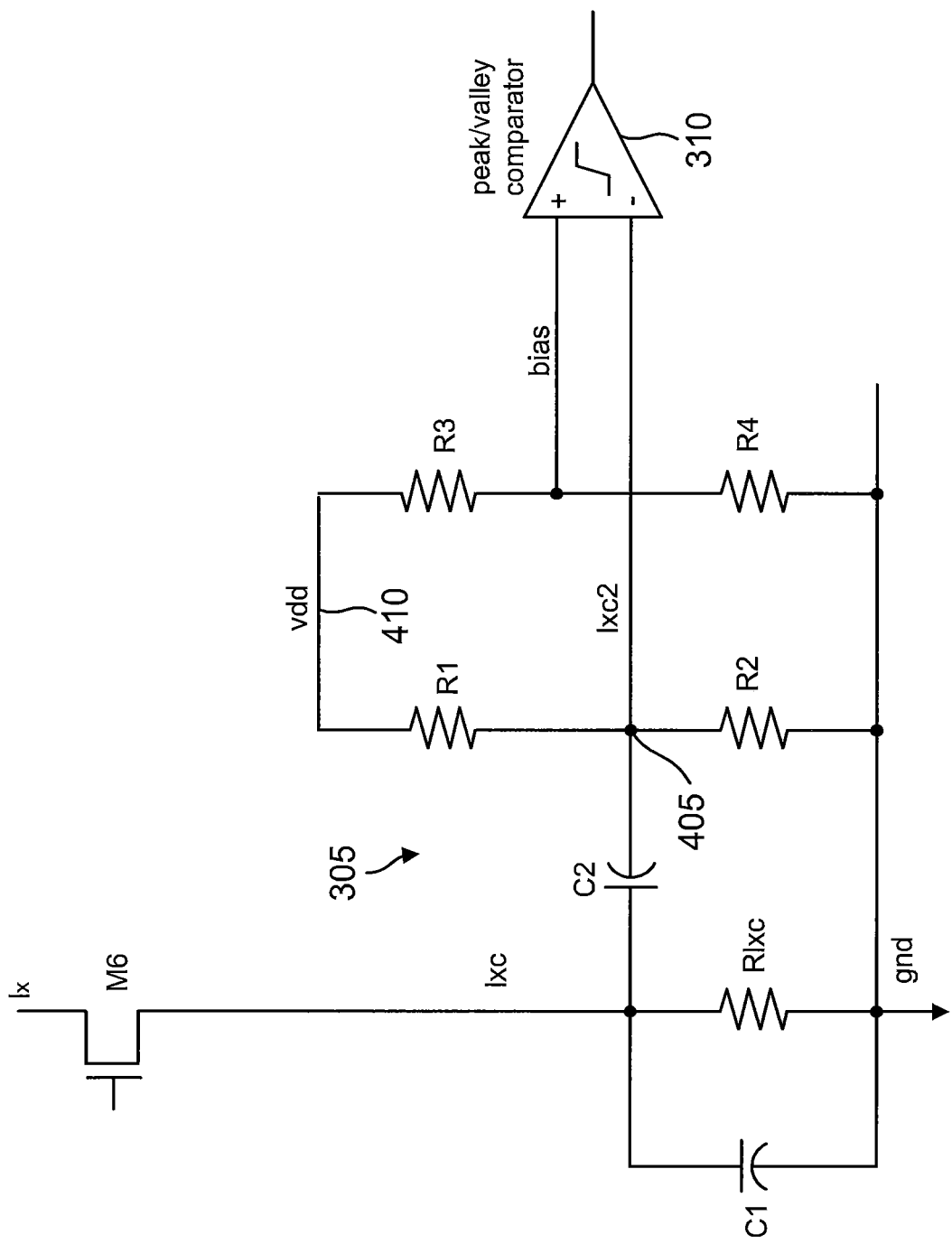
FIG. 4 is a circuit diagram of a type II valley-mode detector in accordance with an aspect of the disclosure.

A type II valley mode detector 400 shown in FIG. 4 will now be discussed. In this embodiment, a node lx is the drain voltage for power switch transistor M1 of FIG. 1A. This drain voltage may be relatively high so it is divided through a capacitive voltage divider formed by a clamp transistor M6 and a capacitor C1 to form a divided drain voltage lxc. To filter low-frequency noise on the divided drain voltage lxc, voltage-dividing capacitor C1 couples in parallel with a resistor Rlxc. To provide an ability to directly detect valleys as well as zero-crossings, divided drain voltage lxc is shifted by 90 degrees through a capacitor C2 to form a phase-shifted voltage lxc2. This phase-shifted voltage is AC coupled onto a DC voltage formed on a voltage divider node 405 between a pair of voltage dividing resistors R1 and R2 that couple between a power supply node 410 for a power supply voltage VDD and ground. For example, resistors R1 and R2 may each have an equal resistance so that the DC voltage for node 410 is VDD/2. As divided voltage lxc resonantly oscillates, phase-shifted voltage lxc2 oscillates through the capacitive coupling provided by capacitor C2. But capacitor C2 phase shifts this oscillation by 90 degrees such that voltage lxc2 oscillates 90 degrees out of phase with divided voltage lxc. Another voltage divider formed by a pair of resistors R3 and R4 coupled between node 410 and ground to form a reference voltage (bias). Resistors R3 and R4 have the same dividing ratio as resistors R1 and R2 so the reference voltage equals the DC common-mode value for voltage lxc2. A comparator 310 compares the reference voltage to voltage lxc2 to directly detect valleys and zero-crossings for the drain-to-source voltage for power switch transistor M1.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A controller for a switching power converter, comprising:
    a valley-mode detector configured to detect valleys in a drain voltage for a power switch transistor, each valley having a positive voltage;
    a zero-crossing detector configured to detect zero-crossings in the drain voltage;
    an adaptive on-time control circuit configured to adjust an on-time period for an auxiliary switch transistor between relatively-short on-time periods that produce only valleys in the drain voltage and relatively-long on-time periods that produce only zero-crossings in the drain voltage to determine an optimal on-time period that produces a zero-crossing in the drain voltage, wherein an on-time period that is shorter than the optimal on-time period produces a valley in the drain voltage rather than a zero-crossing, and wherein the controller is configured to switch on the power switch transistor at the zero-crossing in the drain voltage produced by the optimal on-time period.

2. The controller of claim 1, wherein the auxiliary switch transistor is an active clamp switch transistor in a flyback converter.

3. The controller of claim 1, wherein the auxiliary switch transistor is a synchronous rectifier switch transistor in a flyback converter.

4. The controller of claim 1, wherein the auxiliary switch transistor is a low-side switch transistor in a buck converter.

5. The controller of claim 1, wherein the adaptive on-time control circuit is configured to shorten the on-time period for the auxiliary switch transistor until the valleys are detected.

6. The controller of claim 1, wherein the adaptive on-time control circuit is configured to lengthen the on-time period for the auxiliary switch transistor until the zero-crossings are detected.

7. The controller of claim 1, wherein the valley detector comprises:
    a first voltage divider for dividing a drain voltage of a power switch transistor into a divided drain voltage carried on a divided drain voltage node;
    a second voltage divider for biasing a voltage divider node with a DC bias voltage;
    a capacitor coupled between the voltage divider node and the divided drain voltage node; and a first comparator configured to compare a voltage for the voltage divider node to the DC bias voltage to detect peaks and valleys in the drain voltage of the power switch transistor.

8. The controller of claim 1, wherein the zero crossing detector comprises a comparator configured to compare a drain voltage for a power switch transistor to ground.

9. A controller for a switching power converter, comprising:
a valley-mode detector configured to detect both zero crossings and valleys in a drain voltage for a power switch transistor, each valley having a positive voltage;
an adaptive on-time control circuit configured to adjust an on-time period for an auxiliary switch transistor between relatively-long on-time periods that produce only valleys in the drain voltage and relatively-short on-time periods that produce only zero-crossings in the drain voltage to determine an optimal on-time period that produces a zero-crossing in the drain voltage, wherein an on-time period that is shorter than the optimal on-time period produces a valley in the drain voltage rather than a zero-crossing; and wherein the controller is configured to switch on the power switch transistor switch at the zero-crossing in the drain voltage produced by the optimal on-time period.

10. A controller for a switching power converter, comprising:
a zero crossing detector to detect zero-crossings in a drain voltage of a power switch transistor; and
an adaptive on-time control circuit configured to vary an on-time period for an auxiliary switch transistor from relatively-short on-time periods that produce zero-crossings in the drain voltage to relatively-long on-time periods that do not produce zero-crossings in the drain voltage to determine an optimal on-time period that produces a zero-crossing in the drain voltage, wherein an on-time period that is shorter than the optimal on-time period produces a valley in the drain voltage rather than a zero-crossing, and wherein the controller is configured to switch on the power switch transistor at the zero-crossing produced by the optimal on-time period.

* * * * *

UNITED STATES PATENT AND TRADEMARK OFFICE
CERTIFICATE OF CORRECTION

PATENT NO. : 10,530,260 B2
APPLICATION NO. : 15/876054
DATED : January 7, 2020
INVENTOR(S) : Wenduo Liu et al.

It is certified that error appears in the above-identified patent and that said Letters Patent is hereby corrected as shown below:

In the Specification

In the Detailed Description:

In Column 6, Line 29, change "zero at time to." to --zero at time t0.--

Signed and Sealed this
Eighth Day of September, 2020

Andrei Iancu
*Director of the United States Patent and Trademark Office*